United States Patent
Bergkvist

[11] Patent Number: 5,822,696
[45] Date of Patent: Oct. 13, 1998

[54] SELECTING A COMMUNICATIONS CHANNEL FOR A MOBILE STATION BASED ON HANDOVER INTENSITY

[75] Inventor: Bengt Gunnar Bergkvist, Järfälla, Sweden

[73] Assignee: Telefonaktiebolaget L M Ericsson (publ), Stockholm, Sweden

[21] Appl. No.: 736,196

[22] Filed: Oct. 24, 1996

[51] Int. Cl.⁶ .................................................. H04Q 7/00
[52] U.S. Cl. ........................................... 455/436; 455/437
[58] Field of Search ................................... 455/441, 444, 455/437

[56] References Cited

U.S. PATENT DOCUMENTS

| | | | |
|---|---|---|---|
| 5,517,674 | 5/1996 | Rune | 455/437 |
| 5,530,910 | 6/1996 | Taketsugu | 455/444 |
| 5,574,971 | 11/1996 | Aihara | 455/444 |
| 5,623,535 | 4/1997 | Leung et al. | 455/444 |
| 5,640,677 | 6/1997 | Karlsson | 455/444 |
| 5,659,596 | 8/1997 | Dunn | 455/456 |

FOREIGN PATENT DOCUMENTS

| | | |
|---|---|---|
| 0 660 635 A2 | 12/1994 | European Pat. Off. . |
| 0 692 920 A1 | 7/1995 | European Pat. Off. . |
| WO 95/28813 | 10/1995 | WIPO . |

*Primary Examiner*—Reinhard J. Eisenzopf
*Assistant Examiner*—Makoto Aoki
*Attorney, Agent, or Firm*—Jenkens & Gilchrist, P.C.

[57] ABSTRACT

A threshold limit representing the number of handovers allowed to be performed by a mobile station within a predetermined period of time is assigned to a serving mobile network. In case a fast moving mobile station exceeds the prescribed number of handovers, a cell selection in accordance with the hierarchical cell location method is overruled. Instead, a cell selection in accordance with the normal cell location method is implemented to reduce the number of future handovers by the fast moving mobile station.

21 Claims, 6 Drawing Sheets

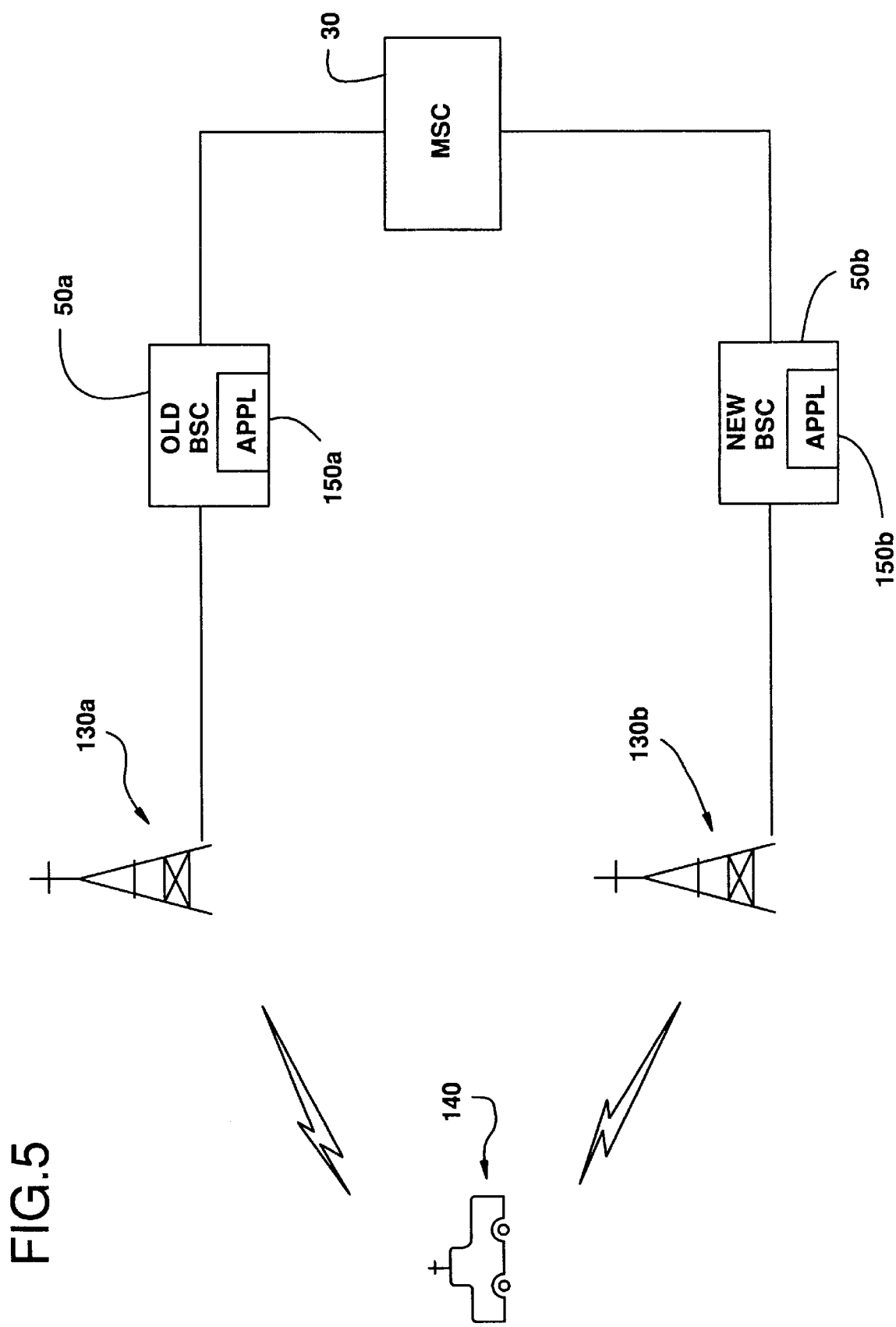

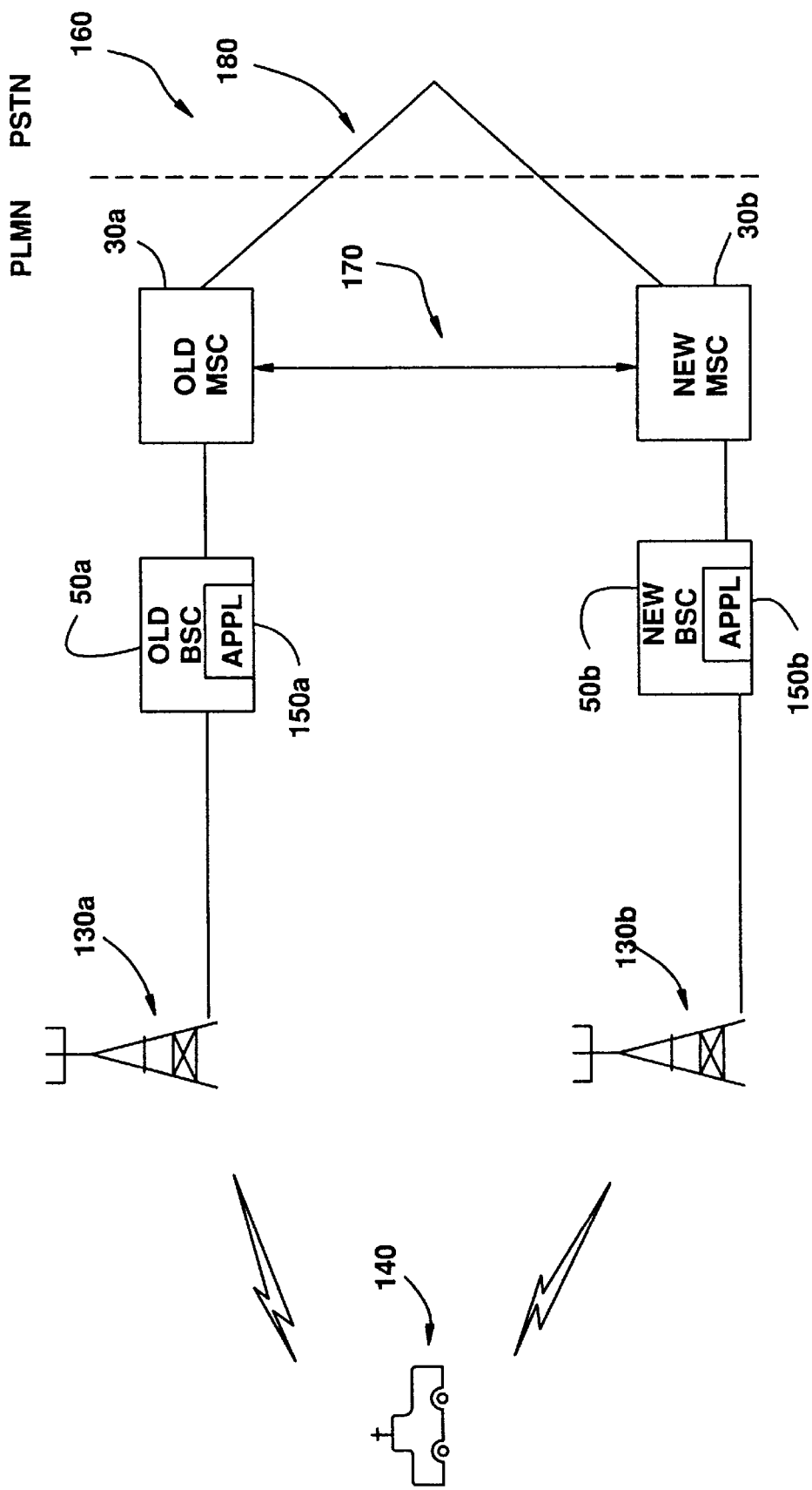

SELECTING A COMMUNICATIONS CHANNEL FOR A MOBILE STATION BASED ON HANDOVER INTENSITY

BACKGROUND OF THE INVENTION

1. Technical Field of the Invention

The present invention relates to mobile telecommunications systems and, in particular, to the facilitation of handover between different layers of hierarchical cells for fast moving mobile stations within a mobile telecommunications network.

2. Description of Related Art

A mobile telecommunications service area associated with a particular Public Land Mobile Network (PLMN) is sub-divided into a number of geographic areas known as cell areas. The size of each cell area is determined by a number of different factors. Such factors include the traffic capacity and carrier-to-interference ratio expected or required from a particular geographic area. The carrier-to-interference ratio (C/I ratio) is defined as the ratio of the level of the received desired signal to the level of the received undesired signal. The distribution of the C/I ratio desired in a system determines the number of frequency groups, F, which may be used. If the total allocation of N channels is partitioned into F groups, then each group will contain N/F channels. Since the total number of channels (N) is fixed, a smaller number of frequency groups (F) would result in more channels per set and per cell. Accordingly, decreasing the number of frequency groups and reducing the frequency re-use distance result in high channel capacity but also results in a lower average C/I distribution in the system. As a result, in order to provide an increase in channel capacity and, at the same, maintain an acceptable C/I ratio, the corresponding cell area needs to be reduced. Inversely, in order to obtain a larger cell area, low channel capacity is maintained by increasing the total number of frequency groups (F).

With the continuing development in mobile telecommunications technology, the concept of hierarchical cells has been introduced. Instead of "planning" or providing a single layer of cells, a number of different over-layed radio coverage cells are provided for a particular geographic area. As an illustration, layer 1 cells (also known as microcells) are first provided with the smallest cell areas. On top of the layer 1 cells, layer 2 cells (also known as macrocells) are provided with larger cell areas. Layer 3 cells can further be over-layed at the very top with even larger cell areas. Such structure ensures optimal coverage, by covering up holes in the cell plan and providing extra capacity for high demand areas.

For example, a microcell with high channel capacity is provided for the demanding downtown Stockholm area and a macrocell with large radio coverage area is concurrently provided for the overall city of Stockholm. When two different cells are covering the same geographic area (e.g., downtown Stockholm) it is desirable to maximize the use of microcell channels for mobile stations traveling within the overlapping area. This is achieved by giving the microcell preference over the macrocell to mobile stations traveling within the overlapping area. Since only mobile stations traveling within the overlapping area can access the associated microcell channels, if no microcell preference is placed, the macrocell channels can be over-utilized by mobile stations located both in and out of the overlapping area while the corresponding microcell channels remain unreachable by the needy mobile stations located outside of the overlapping area. Accordingly, by forcing mobile stations located within the Stockholm downtown area to first utilize microcell channels, the channels associated with the macrocell are left available to mobile stations traveling within the larger Stockholm city area but outside of the smaller downtown area.

Unfortunately, forcing mobile stations traveling within a microcell area to systematically utilize microcell channels is not always desirable. Because of their smaller cell areas, a greater number of microcells have to be involved in order to provide mobile service to a fast moving mobile station (e.g., train or car transported mobile station). Each time a fast moving mobile station travels out of a first microcell area and travels into a second microcell area, a handover between the first microcell and the second microcell has to be performed. Such handover is necessary to communicate the necessary subscriber information between the telecommunications nodes associated with the involved cells and to allocate a new traffic channel in the new cell for the moving mobile station. Unfortunately, such frequent handovers (or hand-offs) between neighboring cells increase the possibility of interrupting the existing radio connections and require additional signaling overhead from the telecommunications nodes serving the involved cells. Therefore, it would be advantageous for the mobile telecommunications network to instead assign such fast moving mobile stations to macrocell channels. Because macrocells provide mobile service for larger geographic areas, by assigning a fast moving mobile station with a macrocell channel, the number of handovers and signaling overhead between the involved macrocells are greatly reduced. Furthermore, the possibility of an interruption of the resulting speech connection is also reduced.

A number of mechanisms have been introduced to prevent the selection of small cells for fast moving mobile stations within a mobile telecommunications system. For instance, one of the methods delays the introduction of a new base station serving a small cell as a candidate for a mobile station requesting a handover. Accordingly, until a mobile station stays within a particular microcell area for a pre-defined period of time, an associated microcell channel is not provided to the mobile station as a possible channel candidate. By delaying the introducing of a microcell channel as a service-providing candidate, a discrimination against small cells in the cell selection process is made and, as a result, a fast moving mobile station staying less than the prescribed time period within a particular microcell is forced to instead select a macrocell channel. However, since the delayed method only evaluates the time spent in each microcell area individually, for a mobile station with variable speeds traveling through a number of different cells, the delayed method cannot prevent unsuitable cell layer selection.

Another mechanism for switching from microcells to macrocells involves estimating the time of entry, the time of exit, the direction of entry, and the direction of exit of a particular mobile station traveling within a particular cell area. If a mobile station enters a particular cell area from one direction and leaves the cell area in another direction within a predetermined amount of time, that mobile station is considered to be a fast moving mobile station and is assigned a macrocell channel. However, this mechanism is also disadvantageous because, in case a mobile station is moving in and out of the same cell area in the same direction, or is periodically changing its speed through a number of different cells, the above mechanism is not able to accurately ascertain the status of the mobile station.

Accordingly, there is a need for a mechanism to enable the serving mobile telecommunications network to more accurately assign cell channels to fast moving mobile stations.

SUMMARY OF THE INVENTION

The present invention discloses a method and apparatus for selecting a cell channel for a fast moving mobile station within a public land mobile network (PLMN). A base station controller (BSC) currently serving the mobile station maintains data representing the time and the number of handovers performed by the mobile station. Subsequently, in response to an indication to handover to another cell, the BSC determines whether the total number of handovers the mobile station has performed during a predefined period of time has exceeded the threshold number assigned to the serving PLMN. In response to an affirmative determination, the serving BSC handovers the mobile station to a cell selected using the normal cell selection method. Otherwise, the serving BSC handovers the mobile station to a cell selected using the hierarchical cell selection method.

In one embodiment, the cell selected using the normal cell selection method comprises a macrocell. On the other hand, the cell selected using the hierarchical cell selection method comprises a microcell.

In another embodiment, the cell selected using the normal cell selection method comprises a cell associated with the strongest signal strength detected by the mobile station.

BRIEF DESCRIPTION OF THE DRAWINGS

A more complete understanding of the method and apparatus of the present invention may be had by reference to the following detailed description when taken in conjunction with the accompanying drawings wherein:

FIG. 5 is a block diagram of a mobile network performing an inter-BSC handover; and FIG. 6 is a block diagram of a mobile network performing an inter-MSC handover in accordance with the teachings of the present invention.

DETAILED DESCRIPTION OF THE DRAWINGS

Figure 1:
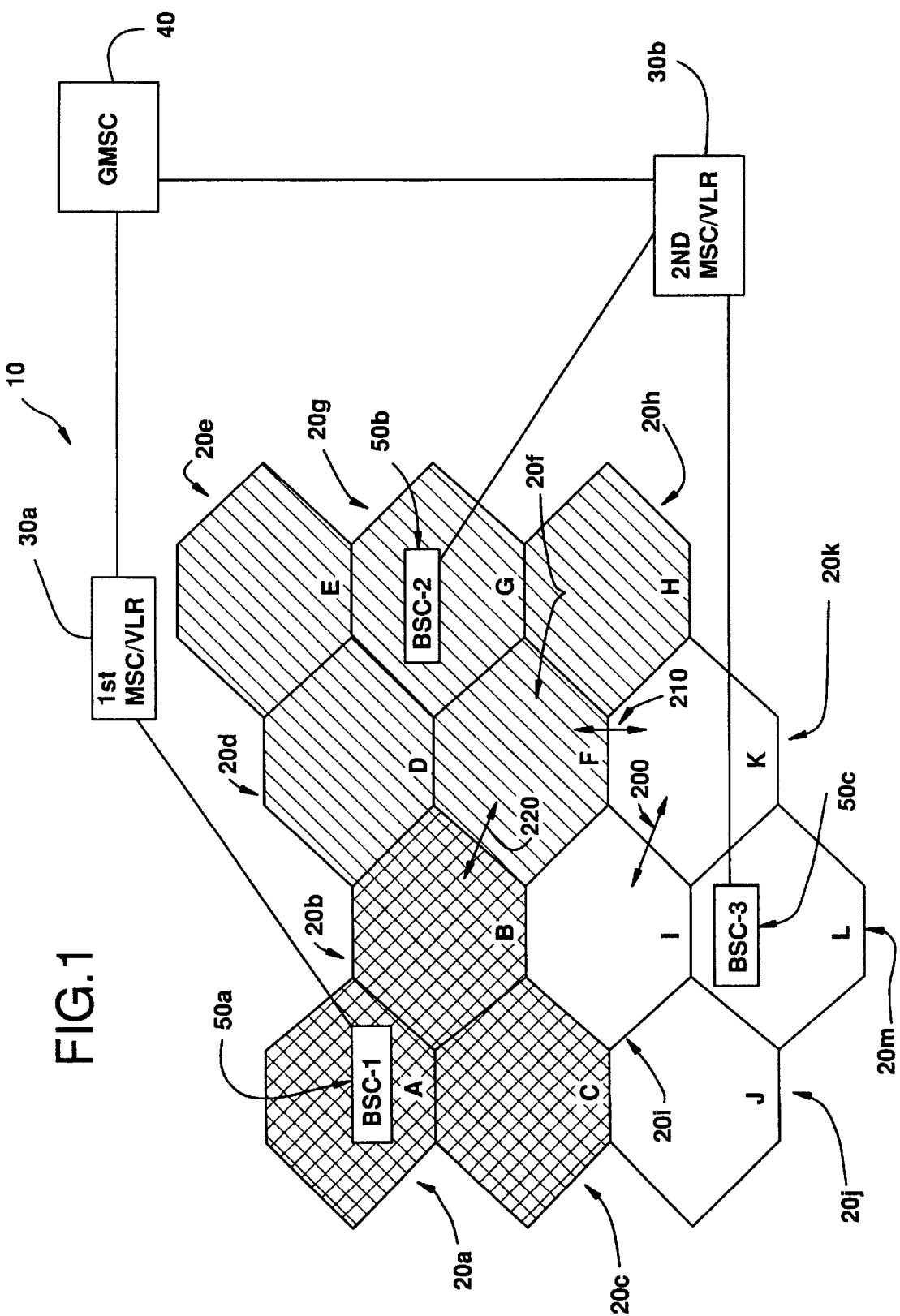
FIG. 1 is a block diagram of a Public Land Mobile Network (PLMN) illustrating a plurality of cell areas being served by multiple base station controllers.

FIG. 1 is a block diagram of a Public Land Mobile Network (PLMN) 10 illustrating a plurality of cell areas 20a–20m being served by multiple base station controllers (BSCs) 50a–50c. A mobile telecommunications service area associated with the particular PLMN 10 is sub-divided into a number of geographic areas known as cell areas 20a–20m. Different groups of neighboring cells (e.g., cells 20a–20c) are then associated with particular base station controllers (e.g., BSC-1 50a). A number of BSCs (e.g., BSC 50b–50c) are, in turn, associated with a particular mobile switching center (e.g., MSC 30b). As an illustration, BSC-1 50a provides mobile service for cell areas 20a–20c, BSC-2 50b provides mobile service for cell areas 20d–20h, and BSC-3 provides mobile service for cell areas 20i–20m, respectively. BSC-1 50a is in turn associated with a first mobile switching center / visitor location register (MSC/VLR) 30a. BSC-2 50b and BSC-3 50c are also similarly associated with a second MSC/VLR 30b. The MSC/VLRs 30a–30b are then further connected to a particular Gateway Mobile Switching Center (GMSC) 40 serving that particular PLMN 10.

In order to provide contiguous mobile service (e.g., a continuous call connection) to a moving mobile station, as that mobile station travels from a first cell area to a second cell area, a process known as a "hand-over" is performed between the involved cells. Depending on the relationship of the first cell to the second cell, an intra-BSC, inter-BSC, or inter-MSC handover is performed. As an illustration, in case the mobile station is traveling from the I-cell 20i to the K-cell 20k, since both cells are associated with the same BSC 50c, an intra BSC handover is performed to provide contiguous mobile service to the moving mobile station. In case the mobile station is traveling from the K-cell 20k to the F-cell 20f, since each cell is associated with different BSCs, an inter-BSC handover is performed. Lastly, in case the mobile station is traveling from the F-cell 20f to the B-cell 20b, since each cell is associated with different MSCs, an inter-MSC handover is performed between the two MSCs. Depending on the nature of the handover, in order to communicate information associated with the moving mobile station to the telecommunications node serving the new cell area, considerable handover overhead functions need to be performed. For example, an available traffic channel has to be seized within the new cell area, control information has to be communicated between the involved cells, and the mobile station has to be instructed to communicate over the newly seized traffic channel.

Figure 2:
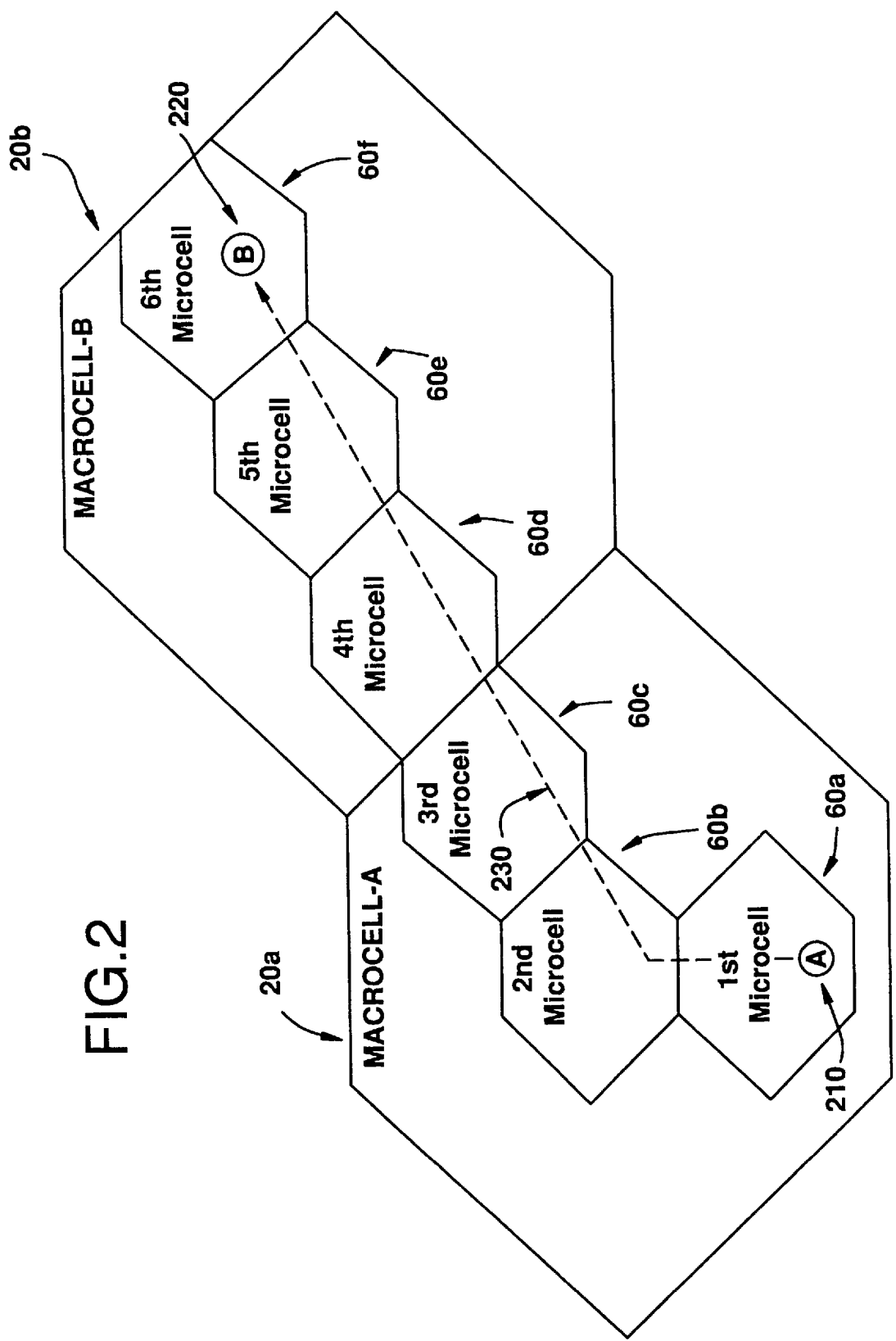
FIG. 2 is a block diagram of a hierarchical cell structure within a particular PLMN.

FIG. 2 is a block diagram of a hierarchical cell structure within a particular PLMN. With the continuing development in the mobile telecommunications technology, the concept of hierarchical cells has been developed. Instead of "planning" or providing a single layer of cells within a particular geographic area, a number of different over-layed radio coverage cells are provided. By "over-layed", it is meant that cells with different radio coverage areas are concurrently provided within the same geographic area. As an illustration, a large cell area (also known as macrocell) 20a is first provided for a particular geographic area. Within the provided macro cell area 20a, certain pockets of smaller geographic regions may require additional mobile service capacity. Instead of increasing the total number of channels (N) or reducing the number of frequency groups (F) associated with the macrocell 20a to increase the channel capacity, a number of smaller cell areas (also known as microcells) 60a–60c are concurrently provided within the macrocell area 20a to cover for those "hot" geographic pockets. By providing an over-layed cell structure, smaller geographic areas with high mobile service requirements can be supported by smaller microcells and, at the same time, an overall larger geographic area encompassing the smaller geographic areas can be supported by a single macrocell. Such a structure ensures optimal and global coverage by covering up holes in the cell plan and providing extra capacity for high demand areas.

As shown in FIG. 2, macrocell-A 20a provides radio coverage for a large geographic area and further includes a number of smaller microcells 60a–60c. Another neighboring macrocell, macrocell-B 20b, is shown associated with macrocell-A for providing contiguous coverage area for mobile stations within a particular PLMN. Within macrocell-B, there are shown three additional microcells 60d–60f for further providing additional coverage for high demand geographic areas. It is to be understood that a far greater number of macrocells and microcells might be needed in order to provide mobile service within a particular PLMN and only two macrocells and six microcells are shown in FIG. 2 for exemplary purposes.

For a mobile station traveling within a particular microcell area (e.g., microcell 60*a*), the concept of hierarchical cell selection method dictates that the mobile station preferably be assigned an available microcell channel. For mobile stations located within a larger macrocell but outside of any microcell area, a normal cell selection method is performed in order to select the best or most appropriate cell channel. Since only mobile stations traveling within a particular microcell area can access both macrocell and microcell channels, it is optimal for the serving mobile service provider to always force those mobile stations to first utilize the available microcell channels. This is because, if mobile stations located within the microcell areas were permitted to freely utilize macrocell channels, there would be a lesser number of macrocell channels remaining for mobile stations traveling outside of the relevant microcell areas but within the macrocell areas. Since these mobile stations cannot access the idle microcell channels, inefficient and wasteful channel resource management results. Therefore, by "pushing down" the mobile stations traveling within a particular microcell area to the microcell layer and causing them to select associated microcell channels, the associated macrocell channels are left available for mobile stations located outside of the microcell area but within the much larger macrocell area. As a result, optimal utilization of both micro and macro channels is achieved.

However, systematically "pushing down" mobile stations located within a microcell area to select an associated microcell channel is not always desirable. Because of their smaller cell areas, a greater number of microcells have to be involved in order to provide uninterrupted mobile service to a fast moving mobile station. For example, in order to travel from point A 210 to point B 220 using a path 230 within a particular PLMN, the mobile stations has to travel through, for example, six different microcells 60*a*–60*f*. As a result, six handovers have to be performed in order to continuously transfer the mobile station from point A 210 to point B 220. Such frequent handovers between neighboring cells are undesirable and inefficient. Each handover introduces additional risks of interrupting the existing radio connections and requires considerable signaling overhead for the telecommunications nodes associated with the involved cells. On the other hand, if the traveling mobile station were assigned to macrocell channels, only two handovers, for example, would be performed in order to provide the same contiguous mobile service from point A 210 to point B 220. Accordingly, for such a fast moving mobile station briefly traveling through a number of microcells, assigning macrocell channels reduces the number of handovers, and thus the signaling overhead, between the involved macrocells. It further reduces the possibility of an interrupt on the existing radio connection of the fast moving mobile station.

Figure 3:
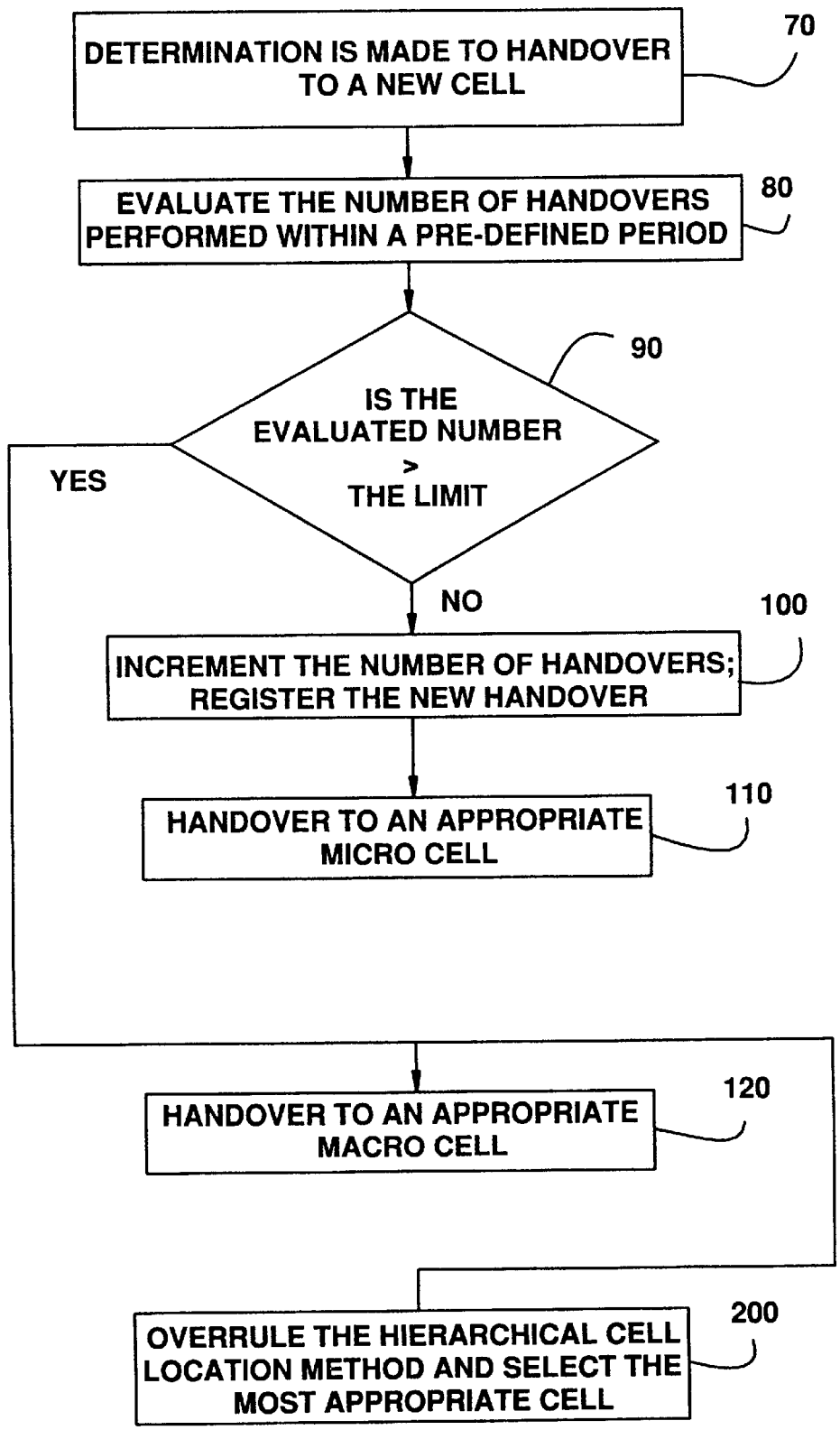
FIG. 3 is a flow chart illustrating the cell selection steps performed in accordance with the teachings of the present invention.

Reference is now made to FIG. 3 illustrating the steps performed in order to assign a cell channel to a fast moving mobile station in accordance with the teachings of the present invention. A determination is initially made by the serving base station controller (BSC) to hand over the mobile station to another cell in a conventional manner at step 70. An application module within the serving BSC then evaluates at step 80 the number of handovers previously performed for that mobile station within a predefined period of time. Such evaluation can be made by maintaining data storing the time stamp of each and every handover performed within the predefined period of time for that particular mobile station. Next, a determination is made at step 90 to ascertain whether the number of handovers performed within the prescribed period of time is within the limit imposed by the serving PLMN. If the number of handovers performed by the mobile station is less than the threshold value imposed by the serving PLMN, a cell selection is performed in accordance with the above described hierarchical cell selection method. Alternatively, any other cell selection method associated with optimizing the utilization of available microcell channels can be used. Accordingly, for a mobile station traveling into a microcell area, an associated microcell channel is preferably selected. The data representing the previous handovers performed by the mobile station are further updated to included the latest handover at step 100. Furthermore, since a mobile station is able to freely access mobile service from any number of BSCs and MSCs, such data representing the handovers performed by the mobile station need to be portable and "follow" the mobile station as it is transferred from one BSC to another. Such received data are then utilized by the new BSC to evaluate the past handover activities of the mobile station when a subsequent determination is made to once again handover the mobile station to yet another cell area. Accordingly, as the mobile station is handed over to the selected microcell channel at step 110, the data representing the mobile station's handover history are further communicated to a telecommunications node associated with the selected microcell. Such a telecommunications node may include a base station controller (BSC) associated with the selected microcell. As a result, the network recognizes the mobile station as a non-fast moving mobile station, and the optimization of channel utilization is performed by "pushing down" the channel allocation to the lowest possible layer of the hierarchical cell structure.

On the other hand, if the number of the handovers performed by the mobile station within the predefined period of time is greater than the threshold limit imposed by the serving PLMN, the mobile station is classified as a fast moving mobile station traveling in and out of a number of cells. In accordance with the teachings of the present invention, in order to reduce the number of future handovers to be performed by the fast moving mobile station, the moving mobile station is instead handed over to a macrocell with much larger radio coverage area at step 120. Alternatively, the hierarchical cell selection method is similarly overruled, and in accordance with the normal cell selection method, the best or the most appropriate cell is selected for the mobile station. One such mechanism includes handing over the mobile station to a cell associated with the highest signal strength detected by the mobile station. Since signal strength associated with macrocells is typically stronger than signal strength associated with corresponding microcells, a macrocell is normally selected. Any other cell selection method to provide the best cell channel choice without considering the hierarchical cell structure can further be utilized.

Figure 4:
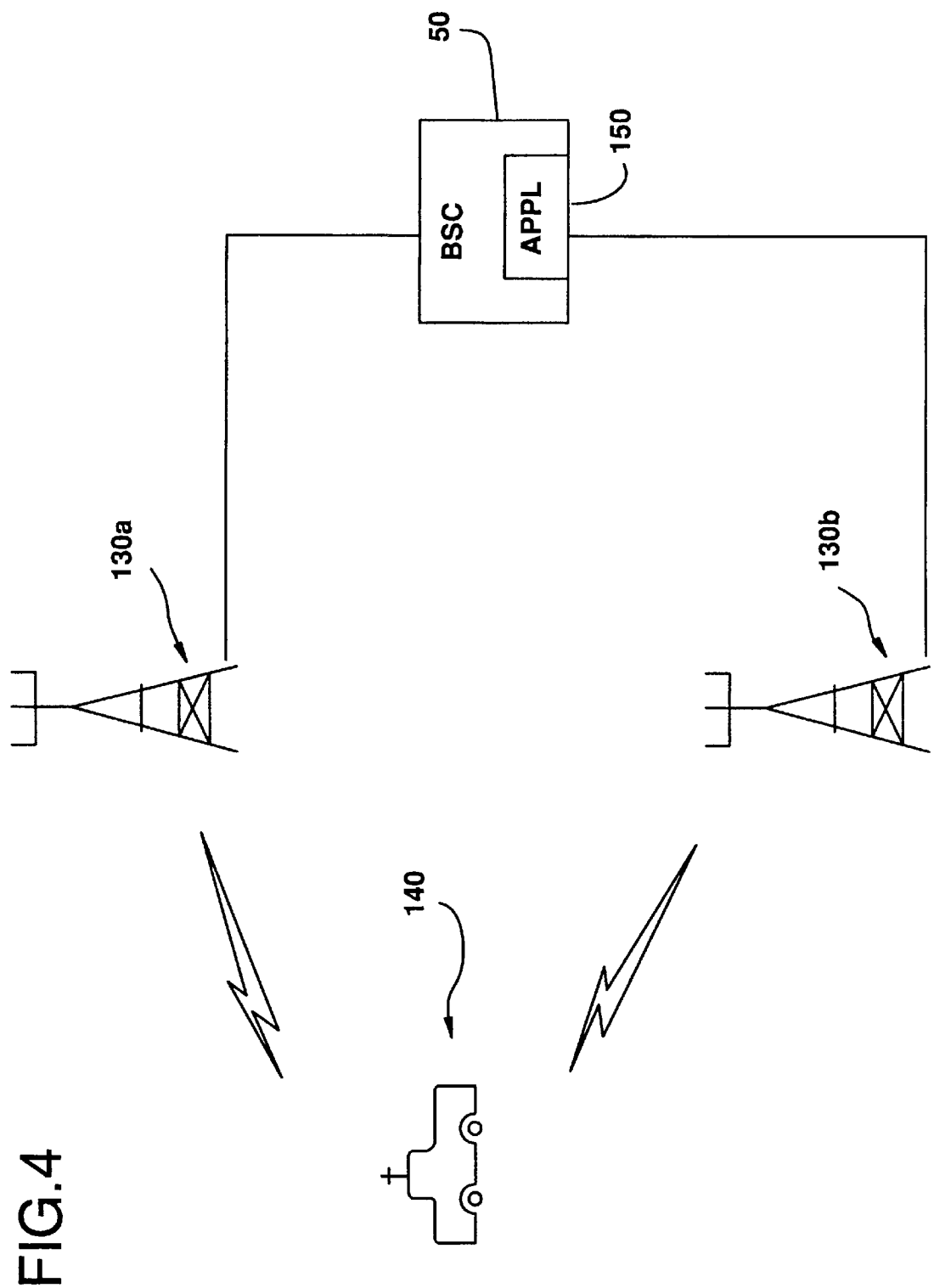
FIG. 4 is a block diagram of a mobile network performing an intra-BSC handover.

FIG. 4 is a block diagram of a mobile network performing an intra-BSC handover in accordance with the teachings of the present invention. Based on the measurements received from a first base transceiver station (BTS) 130*a* currently serving the mobile station 140 and the mobile station itself, an application module 150 within the base station controller (BSC) 50 associated with the first BTS 130*a* determines that the mobile station needs to be handed over to another cell. As fully described in FIG. 3, the application module 150 then selects an appropriate cell to handover the mobile station in accordance with the teachings of the present invention. As described above, the number of handovers the mobile station has performed within a predefined period of time is compared against the threshold limit imposed by the serving BSC 50. In case the mobile station is constituted as a non-fast moving mobile station, a second BTS associated 130*b* with an appropriate microcell is selected. Since the selected second BTS 130*b* is associated with the same BSC 50, an intra-BSC handover is accordingly performed, and no data representing the mobile station's past handover need to be communicated with another BSC. The data representing the frequency of handovers performed by the mobile station 140 are further updated to reflect the latest handover.

On the other hand, if a determination is made by the application module 150 that the mobile station is a fast moving mobile station, a handover is made to a BTS (not shown in FIG. 4) serving a cell selected by the normal cell selection method. For that particular case, the data representing the history of past handovers performed by the mobile station are initialized and new data maintenance is initiated for the mobile station.

FIG. 5 is a block diagram of a mobile network performing an inter-BSC handover. An initial determination is similarly made by an old BSC 50*a* associated with a first BTS 130*a* to handover the traveling mobile station 140 to a new cell. The application module 150*a*, in turn, evaluates the data representing the time and the number of handovers performed by the traveling mobile station 140 and determines whether the mobile station constitutes a fast moving mobile station in accordance with the teachings of the present invention. If the number of previous handovers within the prescribed time period exceeds the threshold limit assigned to the serving BSC, the application module 150*a* performs the normal cell selection method in order to select a target cell. As described above, an available macrocell is selected for wider coverage area, or a cell with the highest signal strength detected by the mobile station is selected. As described previously, any other cell selection method to provide the most appropriate cell selection while disregarding the hierarchical cell structure can be used. On the other hand, if the evaluated number has not exceeded the threshold limit, a cell selection in accordance with the hierarchical cell selection method is performed to "push down" the mobile station.

The old BSC 50*a* then sends a "Handover required message" to the associated MSC 30 together with the identity of the selected cell. The MSC 30 then determines the BSC (new BSC) 50*b* controlling the second BTS 130*b* associated with the selected cell area, and sends a "Handover request message" to the determined BSC 50*b*. The new BSC 50*b* then assigns a traffic channel and performs other overhead functions with the old BSC 50*a* to receive the traveling mobile station 140.

If the selected target cell is a macrocell, the data representing the past handovers associated with the traveling mobile station are initialized. On the other hand, if the selected cell is a microcell, the old application module 150*a* associated with the old BSC 50*a* communicates the data representing the mobile station's past handover activities to the newly selected BSC 50*b*. Such data can be communicated between the two application modules using parameters within the transmitted Handover message. The new application module 150*b* within the new BSC 50*b* then utilizes the received data to properly determine which type of cells to hand over to for a future handover.

FIG. 6 is a block diagram of a mobile network performing an inter-MSC handover in accordance with the teachings of the present invention. As described above, an initial determination is made by the serving BSC (old BSC) 50*a* associated with the serving BTS 130*a* that a handover is needed for the traveling mobile station 140. The application module 150*a* then evaluates the data representing the past handovers performed by the mobile station within a predefined period of time and determines whether to apply the normal cell selection method or the hierarchical cell selection method. Depending on the evaluation of the past handover data against the threshold limit imposed by the serving PLMN, a proper target cell is selected. The old BSC 50*a* then sends a Handover required message to the serving MSC (old MSC) 30*a* together with the identity of the target cell. The old MSC 30*a* realizes that the target cell belongs to another MSC (new MSC) 30*b* and requests a handover number to the new MSC (signal 170). The new MSC 30*b* allocates a new handover number to reroute the call and a Handover request is further sent to the new BSC 50*b*. The new BSC 50*b* orders the new BTS 130*b* associated with the target cell to activate a traffic channel (TCH). The new MSC 30*b* then receives the TCH information from the new BSC 50*b* and passes it on to the old MSC 30*a* together with the handover number. Utilizing the received handover number representing the new MSC as a destination address, a link 160 is set up from the old MSC 30*a* to the new MSC 30*b*, possibly via a Public Switched Telephone Network (PSTN) 160. The old BSC 50*a* then instructs the traveling mobile station 140 to tune to the new frequency and to use the new time slot. As a result, a radio communication link between the traveling mobile station 140 and the new BTS 130*b* is established.

Similarly, if the new BTS 130*b* is associated with a macrocell, the old application module 150*a* initializes the data representing the past handovers performed by the traveling mobile station 140 and new data are compiled by the new application module 150*b* within the new BSC 50*b*. On the other hand, if the new BTS 130*b* is associated with a microcell, the old application module 150*a* updates the data to reflect the latest handover and communicates the updated data to the new BSC 50*b* via the Handover signals 170. The new application module 150*b* then utilizes the received data to determine the appropriate target cell in case another handover is needed for the traveling mobile station.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for selecting a new cell channel for a mobile station traveling out of a cell area and traveling into a geographic area concurrently covered by a microcell and a macrocell within a mobile telecommunications network, wherein said mobile station can be assigned a traffic channel within either said macrocell or said microcell in accordance with a hierarchical cell selection procedure or another cell selection procedure, said method comprising the steps of:

determining a need to handover said mobile station to one of said microcell or macrocell;

determining an actual number of handovers that occurred within a particular period of time within said mobile telecommunications network;

determining whether the actual number of handovers performed by said mobile station within said particular period of time is less than a threshold number of handovers; and in response to an affirmative determination,
    performing said hierarchical cell selection procedure to handover said mobile station to either said macrocell or said microcell;
otherwise;
    performing said another cell selection procedure to handover said mobile station to either said macrocell or said microcell based on a highest signal strength detected by said mobile station.

2. The method of claim 1 wherein said step of performing said hierarchical cell selection procedure comprises a step of selecting the traffic channel associated with said microcell.

3. The method of claim 1 wherein said step of performing said another cell selection procedure comprises a step of selecting the traffic channel associated with said macrocell.

4. The method of claim 1 wherein said step of performing said hierarchical cell selection procedure further comprises the steps of:
    maintaining data representing said handover being performed to said selected cell; and
    communicating said data to a telecommunications node associated with said selected cell.

5. The method of claim 4 wherein said telecommunications node comprises a base station controller (BSC) associated with said selected cell.

6. The method of claim 4 wherein said data further includes a time stamp indicating the time said handover was performed.

7. The method of claim 4 wherein said step of communicating said data utilizes handover signals.

8. A method for handing over a mobile station from a first geographic area to a second geographic area within a mobile telecommunications network, said second geographic area being served by a plurality of cells including a microcell and a macrocell, said method comprising the steps of:
    determining a number of handovers performed by said mobile station within a particular period of time;
    evaluating whether said determined number of performed handovers exceeds a threshold number of handovers;
    if yes,
        handing over said mobile station to a particular one of said plurality of cells using a first cell selection procedure based on signal strength detected by said mobile station;
    otherwise,
        handing over said mobile station to a particular one of said plurality of cells using a second cell selection procedure based on a hierarchical procedure.

9. The method of claim 8 wherein said second cell selection procedure includes handing over said mobile station to said microcell.

10. The method of claim 9 wherein said step of handing over said mobile station to said microcell further comprises the steps of:
    generating data representing said handover to said microcell; and
    communicating said data to a telecommunications node serving said microcell.

11. The method of claim 10 wherein said data includes a time stamp indicating the time of said handover.

12. The method of claim 8 wherein said step of handing over said mobile station to said particular one of said plurality of cells using said first cell selection procedure comprises a step of handing over said mobile station to said macrocell.

13. The method of claim 12 wherein said step of handing over said mobile station to said macrocell further comprises the step of initializing data representing a number of handovers performed by said mobile station.

14. A system for handing over a mobile station from a first geographic area to a second geographic area within a mobile telecommunications network, said second geographic area being served by a plurality of cells including a microcell and a macrocell, said system, comprising:
    a processor for determining a number of handovers performed by said mobile station within a particular period of time;
    said processor further includes evaluating whether said determined number of performed handovers exceeds a threshold number of handovers;
    if yes,
        a module for handing over said mobile station to particular one of said plurality of cells utilizing a first cell selection method based on signal strength detected by said mobile station; otherwise,
        said module for handing over said mobile station to particular one of said plurality of cells utilizing a second cell selection method based on a hierarchical procedure.

15. The system of claim 14 wherein said processor includes an application module.

16. The system of claim 14 wherein said module includes a base station controller.

17. The system of claim 14 wherein said particular one of said plurality of cells selected using said first cell selection method comprises said macrocell.

18. The system of claim 14 wherein said second cell selection method comprises a hierarchical cell selection method wherein said mobile station is handed over to said microcell.

19. The system of claim 18 further comprising:
    a generator for generating data representing said handover to said microcell; and
    a transmitter for communicating said data with said telecommunications node associated with said microcell.

20. The system of claim 19 wherein said system further includes a telecommunications node having a base station controller serving said microcell.

21. The system of claim 19 wherein said data includes a time stamp indicating the time of said handover.

* * * * *